United States Patent
Li

(10) Patent No.: US 8,423,708 B2
(45) Date of Patent: *Apr. 16, 2013

(54) METHOD OF ACTIVE FLASH MANAGEMENT, AND ASSOCIATED MEMORY DEVICE AND CONTROLLER THEREOF

(75) Inventor: Xiangrong Li, Beijing (CN)

(73) Assignee: Silicon Motion Inc., Jhubei, Hsinchu County (TW)

(*) Notice: Subject to any disclaimer, the term of this patent is extended or adjusted under 35 U.S.C. 154(b) by 474 days.

This patent is subject to a terminal disclaimer.

(21) Appl. No.: 12/690,082

(22) Filed: Jan. 19, 2010

(65) Prior Publication Data

US 2011/0138108 A1 Jun. 9, 2011

(30) Foreign Application Priority Data

Dec. 3, 2009 (TW) ............................... 98141339 A

(51) Int. Cl.
*G06F 13/00* (2006.01)
(52) U.S. Cl.
USPC .......................... 711/103; 711/154; 711/157

(58) Field of Classification Search ................. 711/103, 711/154, 157
See application file for complete search history.

(56) References Cited

U.S. PATENT DOCUMENTS

| | | | |
|---|---|---|---|
| 2007/0174551 A1* | 7/2007 | Cornwell et al. | 711/118 |
| 2007/0239927 A1* | 10/2007 | Rogers et al. | 711/103 |
| 2008/0089161 A1* | 4/2008 | Wong et al. | 365/226 |
| 2009/0100215 A1* | 4/2009 | Nochimowski | 711/103 |

* cited by examiner

*Primary Examiner* — Reba I Elmore
(74) *Attorney, Agent, or Firm* — Winston Hsu; Scott Margo

(57) ABSTRACT

A method of active Flash management is provided. The method is applied to a controller of a memory device, where the controller is utilized for accessing a Flash memory in the memory device, and the Flash memory includes a plurality of blocks. The method includes: extracting high level information of a file system of the Flash memory from contents stored in the Flash memory; and according to the high level information, managing operations that the controller performs on the Flash memory, in order to optimize at least one portion of the operations. An associated memory device and the controller thereof are further provided.

21 Claims, 4 Drawing Sheets

METHOD OF ACTIVE FLASH MANAGEMENT, AND ASSOCIATED MEMORY DEVICE AND CONTROLLER THEREOF

BACKGROUND OF THE INVENTION

1. Field of the Invention

The present invention relates to access to a file system of a memory device, and more particularly, to a method of active Flash management, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. Although there are some solutions proposed by the related art in response to these problems, it seems unlikely that the related art gives consideration to both operation performance and system resource management. As a result, no matter which solution is chosen, a corresponding side effect typically exists.

In addition, it seems that the related art does not manage file systems of memory devices (e.g. the portable memory devices or the SSDs mentioned above) well. Typically, when the file systems of the memory devices are accessed, only low level information such as the information of the logical block address (LBA) layer (and more particularly, logical block addresses) are utilized for control, so it is likely for the related art to encounter low performance problems, such as problems of unnecessary or improper operations, improper use of the storage space, or unnecessary consumption of the buffering space. Thus, a novel method is required for enhancing the control of data access of a Flash memory in a memory device, in order to give consideration to both operation performance and system resource management.

SUMMARY OF THE INVENTION

It is therefore an objective of the claimed invention to provide a method of active Flash management, and to provide an associated memory device and a controller thereof, in order to solve the above-mentioned problems.

According to a preferred embodiment of the claimed invention, a method of active Flash management is provided. The method is applied to a controller of a memory device, where the controller is utilized for accessing a Flash memory in the memory device, and the Flash memory comprises a plurality of blocks. The method comprises: extracting high level information of a file system of the Flash memory from contents stored in the Flash memory; and according to the high level information, managing operations that the controller performs on the Flash memory, in order to optimize at least one portion of the operations.

While the method mentioned above is disclosed, an associated memory device is further provided. The memory device comprises: a Flash memory comprising a plurality of blocks; and a controller arranged to access the Flash memory and manage the plurality of blocks, and to perform active Flash management. In addition, the controller extracts high level information of a file system of the Flash memory from contents stored in the Flash memory. Additionally, according to the high level information, the controller manages operations that the controller performs on the Flash memory, in order to optimize at least one portion of the operations.

While the method mentioned above is disclosed, a controller of a memory device is further provided, wherein the controller is utilized for accessing a Flash memory of the memory device, and the Flash memory comprises a plurality of blocks. The controller comprises: a read only memory (ROM) arranged to store a program code; and a microprocessor arranged to execute the program code to control the access to the Flash memory and manage the plurality of blocks, wherein the controller that executes the program code by utilizing the microprocessor is further arranged to perform active Flash management. In addition, the controller that executes the program code by utilizing the microprocessor extracts high level information of a file system of the Flash memory from contents stored in the Flash memory. Additionally, according to the high level information, the controller that executes the program code by utilizing the microprocessor manages operations that the controller performs on the Flash memory, in order to optimize at least one portion of the operations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
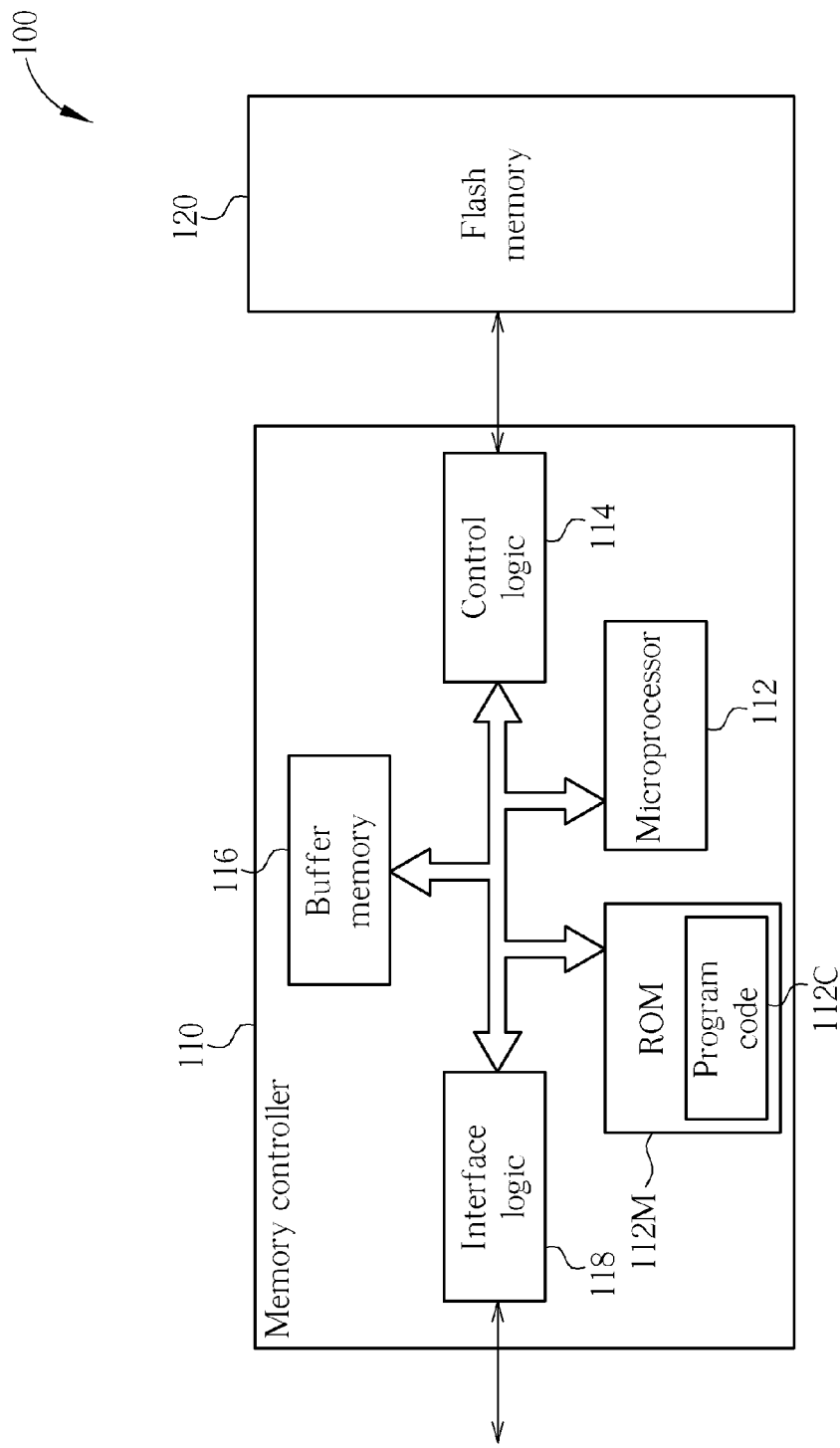
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment can be a portable memory device (e.g. a memory card complying with SD/MMC, CF, MS, or XD standards) or a solid state drive (SSD). The memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118. In addition, the ROM 112M is arranged to store a program code 112C, and the microprocessor 112 is arranged to execute the program code 112C to control the access to the Flash memory 120. Please note that, according to different variations of this embodiment, the program code 112C can be stored in the buffer memory 116 or any other memory.

Typically, the Flash memory 120 comprises a plurality of blocks, and the controller (e.g. the memory controller 110 that executes the program code 112C by utilizing the microprocessor 112) performs data erasure operations on the Flash memory 120 by erasing in units of blocks. In addition, a block can be utilized for recording a specific amount of pages, where the controller mentioned above performs data writing operations on the Flash memory 120 by writing/programming in units of pages.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device.

According to this embodiment, in addition to accessing the Flash memory 120, the controller mentioned above is capable of performing active Flash management. More specifically, the controller can extract high level information of a file system of the Flash memory 120 from contents stored in the Flash memory 120 and further perform active Flash management accordingly, rather than passively controlling only by the aid of low level information such as the information of the logical block address (LBA) layer (and more particularly, logical block addresses) as in the related art. In addition, according to the high level information, the controller can manage operations that the controller performs on the Flash memory 120, in order to optimize at least one portion of the operations. Related details are described by referring to FIG. 2.

Figure 2:
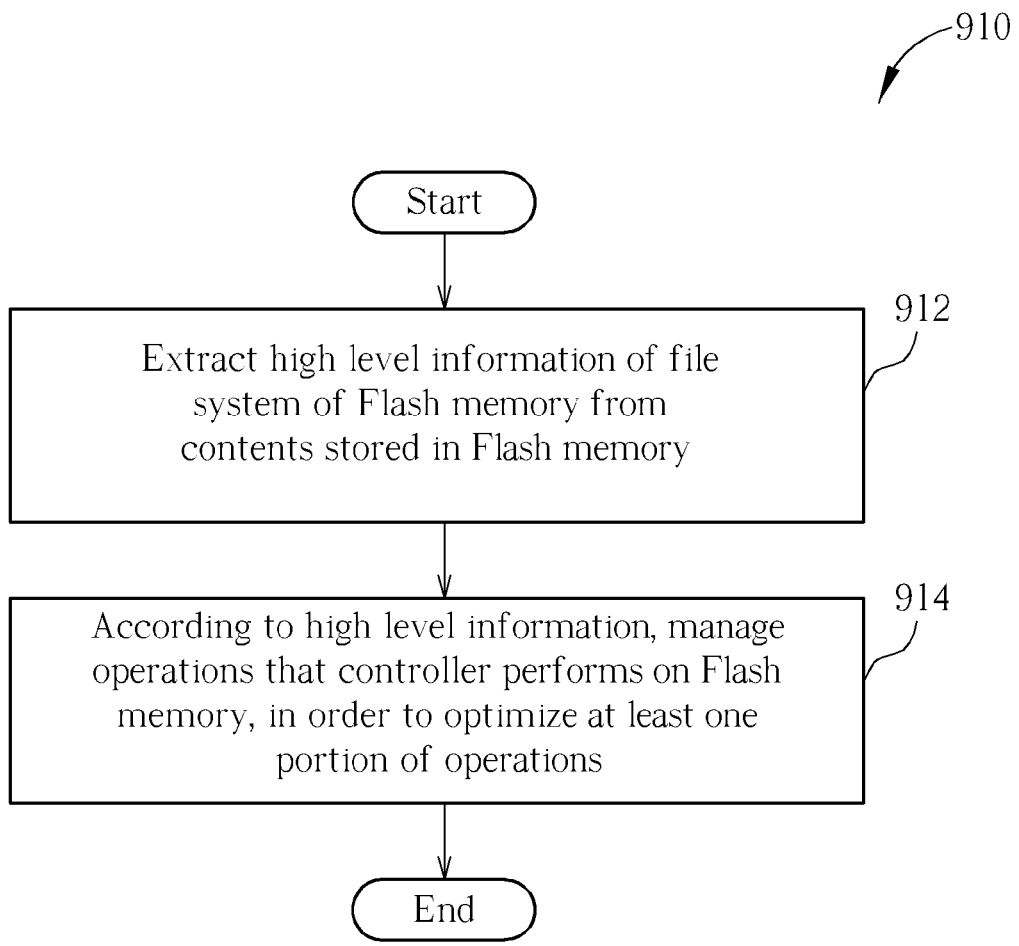
FIG. 2 is a flowchart of a method of active Flash management according to an embodiment of the present invention.

FIG. 2 is a flowchart of a method 910 of active Flash management according to an embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above. The method 910 is described as follows.

In Step 912, the aforementioned controller (e.g. the memory controller 110 that executes the program code 112C by utilizing the microprocessor 112) extracts high level information of a file system of the Flash memory 120 from contents stored in the Flash memory 120. In particular, the controller actively extracts the high level information and temporarily stores the high level information for further use. For example, the controller may temporarily store the high level information into the buffer memory 116. In another example, the controller may temporarily store the high level information into any other memory in the controller.

In Step 914, the controller manages operations that the controller performs on the Flash memory 120, in order to optimize at least one portion of the operations. In particular, according to the high level information that is temporarily stored in Step 912, the controller manages the operations that the controller performs on the Flash memory 120, in order to optimize at least one portion of the operations.

According to this embodiment, the high level information may comprise a master boot record (MBR), partition information, and/or file system information. According to a special case of this embodiment, the file system comprises a plurality of partitions, and the high level information comprises partition information and file system information of the partitions. Thus, in Step 912, the controller extracts the partition information and the file system information of the partitions from the contents stored in the Flash memory 120. For example, the file system of the Flash memory 120 comprises a plurality of partitions P(1), P(2), P(3), . . . , and P(M), and the partition information comprises the partition information of each partition P(m) within the partitions P(1), P(2), P(3), . . . , and P(M) and the file system information of the partition P(m), where m is an integer and may vary within the interval of [1, M].

In this embodiment, when it is detected that the high level information is changed or is going to be changed, the controller extracts at least one portion of a latest version of the high level information (e.g. a portion or all of the latest version of the high level information), and manages the operations of the Flash memory 120 accordingly, in order to optimize at least one portion of the operations. More specifically, when it is detected that the high level information is changed or is going to be changed, the controller extracts at least one portion of the latest version of the high level information, in order to update the temporarily stored high level information. For example, when it is detected that there is a write operation of a partition table, the controller updates the high level information that is temporarily stored.

Figure 3:
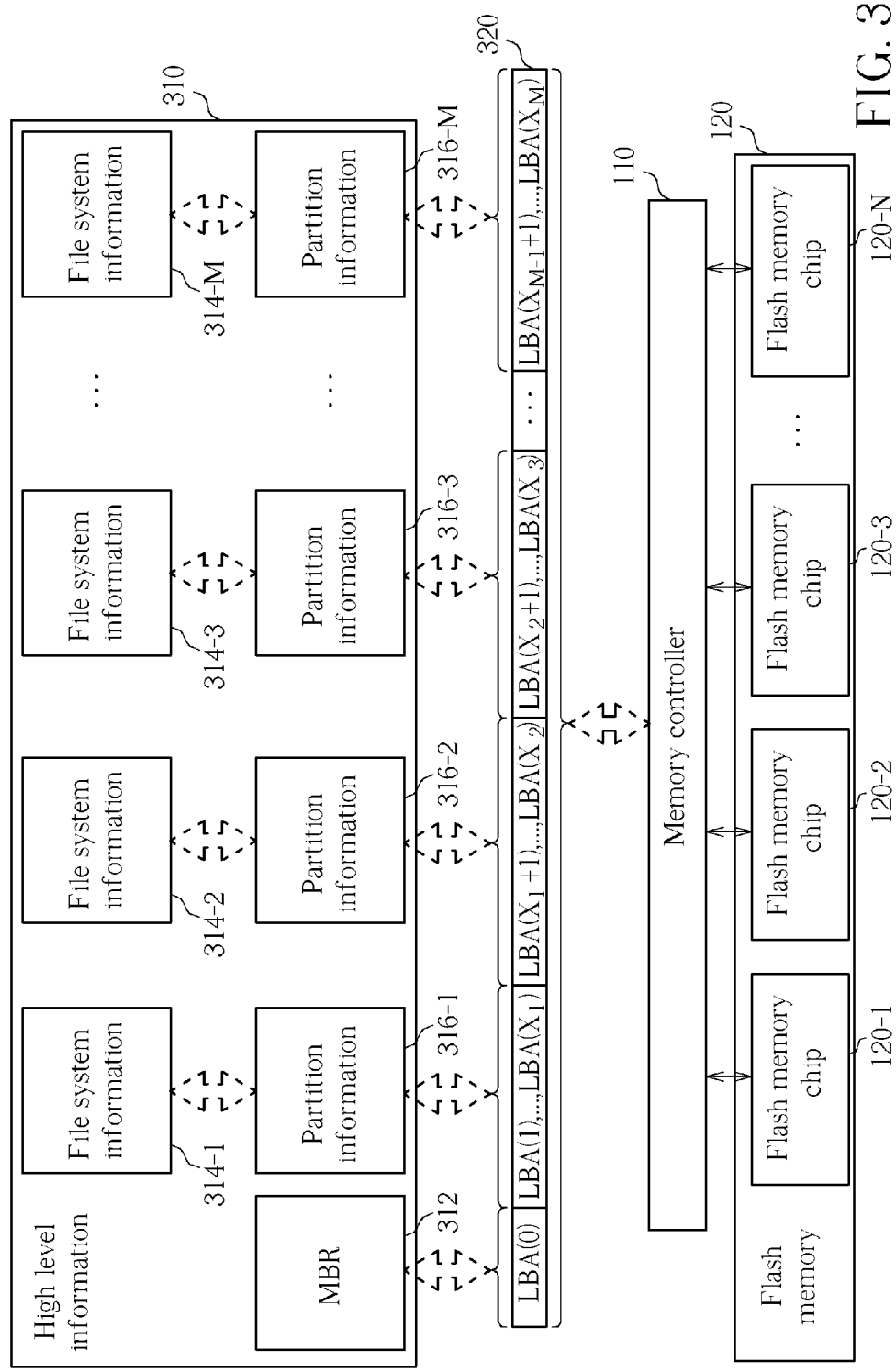
FIG. 3 illustrates diagrams of high level information involved with the method shown in FIG. 2 according to an embodiment of the present invention.

FIG. 3 illustrates diagrams of the high level information 310 involved with the method 910 shown in FIG. 2 according to an embodiment of the present invention, where this embodiment is a variation of the embodiment shown in FIG. 2. The high level information 310 comprises the MBR 312, the file system information 314-1, 314-2, 314-3, . . . , and 314-M, and the partition information 316-1, 316-2, 316-3, . . . , and 316-M, and more particularly, the corresponding partition information of the respective partitions P(1), P(2), P(3), . . . , and P(M) mentioned above. For example, the file system information 314-1 can be file allocation table (FAT) file system information. In another example, the file system information 314-2 can be new technology file system (NTFS) information. In another example, the file system information 314-3 can be second extended file system information, i.e. the system information of the second extended file system, which is known as EXT2.

Here, the logical block addresses 320 can be regarded as low level information such as that mentioned above. As shown in FIG. 3, the logical block address LBA(0) is utilized for access regarding the MBR 312, the logical block addresses LBA(1), LBA(2), . . . , and LBA($X_1$) are utilized for access regarding the partition information 316-1, the logical block addresses LBA($X_1$+1), LBA($X_1$+2), . . . , and LBA($X_2$) are utilized for access regarding the partition information 316-2, the logical block addresses LBA($X_2$+1), LBA($X_2$+2), ..., and LBA($X_3$) are utilized for access regarding the partition information 316-3, and so on. Thus, the logical block addresses LBA($X_{M-1}$+1), LBA($X_{M-1}$+2), ..., and LBA($X_m$) are utilized for access regarding the partition information 316-M. As a result, for any possible value of m, the logical block addresses LBA($X_{m-1}$+1), LBA($X_{m-1}$+2), ..., and LBA($X_m$) are utilized for access regarding the partition information 316-m, where $X_0$=0.

According to this embodiment, the memory controller 110 can access the Flash memory chips 120-1, 120-2, 120-3, ..., and 120-N within the Flash memory 120 according to the logical block addresses 320, and perform the active Flash management according to the high level information 310. For example, as files and directories have different read/write characteristics, the memory controller 110 can determine whether the current target to be visited in the file system is a file or a directory according to the high level information 310, and then perform the corresponding processing according to the determination result. More particularly, according to the high level information 310, the memory controller 110 can select a proper read/write mode from a plurality of read/write modes for use. In another example, as different types of files have different read/write characteristics, the memory controller 110 can determine the file type of a file, and then perform the processing corresponding to the file type on the file. In another example, regarding the FAT file system, the memory controller 110 can obtain the location of the FAT and the size of each cluster from the high level information 310. As a result, by utilizing the obtained information such as the location of the FAT and the size of each cluster, the memory controller 110 can process more accurately with regard to the small file management (i.e. the management of small-sized files).

Please note that, due to controlling only by the aid of the low level information such as the information of the logical block address layer mentioned above (and more particularly, the logical block addresses), the related art can hardly perform optimization logically on various operations such as read/write operations. For example, in a situation where there exist many fragments in a conventional Flash disk drive, the fragments may cause a physically discontinuous write operation when the conventional controller of the Flash disk drive performs the so-called sequential write on a file. In contrast to this, when implementing according to the present invention, these related art problems will never occur. As the aforementioned high level information (e.g. the high level information 310) is obtained and can be utilized for reference, during writing, the memory controller 110 can optimize a plurality of physically discontinuous write operations to be a physically continuous write operation. Thus, the access speed of the memory device 100 can be greatly increased.

In addition, due to controlling only by the aid of the low level information such as the information of the logical block address layer mentioned above, it seems unlikely that the related art can predict a region that should be handled by using the small file management. More particularly, when performing the small file management, the related art typically estimates approximately based upon the storage volume, or draws a conclusion based upon previous write operations in order to obtain a determination result of whether to perform the small file management with regard to the current logical block address, causing inaccurate management and the need of additional management operations, where the additional management operations typically cannot stay in synchronization with real write operations. As a result, low performance is introduced. In contrast to this, when implementing according to the present invention, these related art problems will never occur. As the aforementioned high level information (e.g. the high level information 310) is obtained and can be utilized for reference, before performing one or more write operations, the memory controller 110 can determine in advance whether to operate by using the small file management with regard to the logical block address(es) at which data is going to be written.

Therefore, by extracting and utilizing the high level information mentioned above (e.g. the high level information 310), the present invention method and the associated memory device and the controller thereof can provide extremely high performance.

Figure 4:
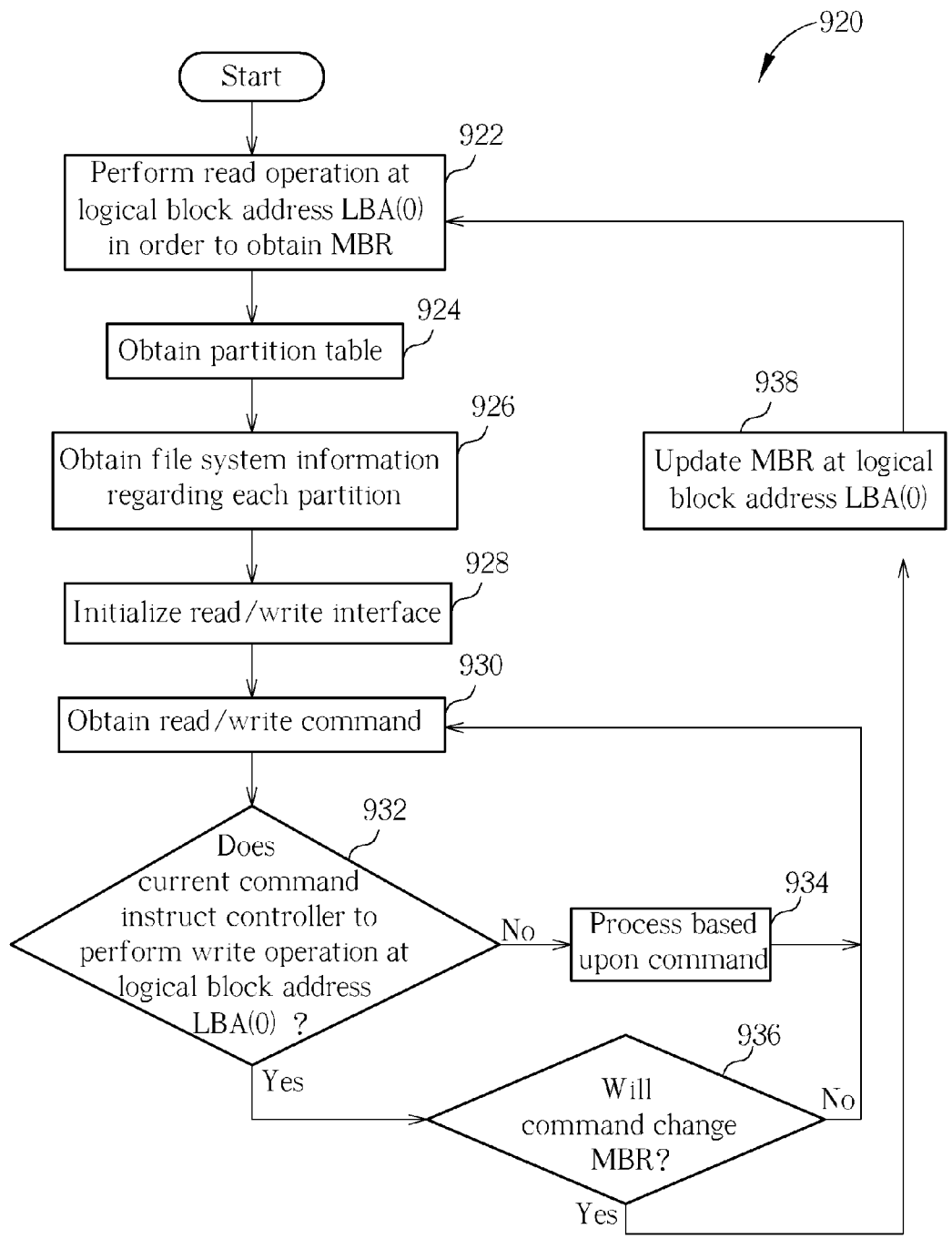
FIG. 4 illustrates diagrams of some implementation details of the method shown in FIG. 2 according to an embodiment of the present invention.

FIG. 4 illustrates diagrams of some implementation details of the method 910 shown in FIG. 2 according to an embodiment of the present invention, where this embodiment is a variation of the embodiment shown in FIG. 2. After the memory device 100 boots up, the controller (e.g. the memory controller 110 that executes the program code 112C by utilizing the microprocessor 112) can execute the working flow 920 shown in FIG. 4 to perform the active Flash management. The working flow 920 is described as follows:

In Step 922, the controller performs a read operation at the logical block address LBA(0) in order to obtain the MBR mentioned above, such as the MBR 312.

In Step 924, the controller obtains a partition table. In particular, the controller reads at least one portion of the partition information 316-1, 316-2, 316-3, ..., and 316-M.

In Step 926, the controller obtains the file system information regarding each partition. In particular, the controller reads at least one portion of the file system information 314-1, 314-2, 314-3, ..., and 314-M.

In Step 928, the controller initializes the read/write interface. In particular, the controller may initialize the control logic 114 and/or the interface logic 118.

In Step 930, the controller obtains a read/write command, and more particularly, obtains a read/write command from the interface logic 118.

In Step 932, the controller checks whether the current command instructs the controller to perform a write operation at the logical block address LBA(0). When it is detected that the current command instructs the controller to perform a write operation at the logical block address LBA(0), Step 936 is entered; otherwise, Step 934 is entered.

In Step 934, the controller processes based upon the command. For example, the controller can directly process based upon the read/write command obtained in Step 930. In another example, the controller can perform corresponding processing regarding the read/write command obtained in Step 930 according to one or more determination results generated by the active Flash management of the controller. After Step 934 is executed, Step 930 is re-entered.

In Step 936, the controller checks whether the command (i.e. the command obtained in Step 930, and more particularly, a command that instructs the controller to perform a write operation at the logical block address LBA(0)) will change the MBR. When it is detected that the command will change the MBR, Step 938 is entered; otherwise, Step 930 is re-entered.

In Step 938, the controller updates the MBR at the logical block address LBA(0). After Step 938 is executed, Step 922 is re-entered.

According to a variation of this embodiment, in Step 934, the controller can perform a hybrid operation corresponding to a plurality of commands, whose operations are combined for execution at a time, in order to perform the active Flash management. Similar descriptions are not repeated in detail for this variation.

It is an advantage of the present invention that, by utilizing the high level information, the controller can select the most suitable method corresponding to the high level information for use when performing various operations of the file system. As a result, the present invention method and the associated memory device and the controller thereof can provide extremely high performance. In addition, by utilizing the present invention, the related art problems such as the problems of unnecessary or improper operations, improper use of the storage space, or unnecessary consumption of the buffering space will never occur. Therefore, the present invention can give consideration to both operation performance and system resource management.

Those skilled in the art will readily observe that numerous modifications and alterations of the device and method may be made while retaining the teachings of the invention.

What is claimed is:

1. A method of active Flash management, the method being applied to a controller of a memory device, the controller being utilized for accessing a Flash memory in the memory device, the Flash memory comprising a plurality of blocks, the method comprising:
   extracting high level information of a file system of the Flash memory from contents stored in the Flash memory; and
   according to the high level information, managing operations that the controller performs on the Flash memory, in order to optimize at least one portion of the operations.

2. The method of claim 1, wherein the step of extracting the high level information of the file system of the Flash memory from the contents stored in the Flash memory further comprises:
   actively extracting the high level information and temporarily storing the high level information for further use.

3. The method of claim 2, wherein the step of managing the operations that the controller performs on the Flash memory further comprises:
   according to the temporarily stored high level information, managing the operations that the controller performs on the Flash memory.

4. The method of claim 1, wherein the high level information comprises a master boot record (MBR), partition information, and/or file system information.

5. The method of claim 4, wherein in a situation where the high level information comprises the file system information, the file system information comprises file allocation table (FAT) file system information, new technology file system (NTFS) information, and/or second extended file system information.

6. The method of claim 1, wherein the file system comprises a plurality of partitions, and the high level information comprises partition information and file system information of the partitions; and the step of extracting the high level information of the file system of the Flash memory from the contents stored in the Flash memory further comprises:
   extracting the partition information and the file system information of the partitions from the contents stored in the Flash memory.

7. The method of claim 1, further comprising:
   when it is detected that the high level information is changed or is going to be changed, extracting at least one portion of a latest version of the high level information, and managing the operations of the Flash memory accordingly, in order to optimize at least one portion of the operations.

8. A memory device, comprising:
   a Flash memory comprising a plurality of blocks; and
   a controller arranged to access the Flash memory and manage the plurality of blocks, and to perform active Flash management, wherein the controller extracts high level information of a file system of the Flash memory from contents stored in the Flash memory;
   wherein according to the high level information, the controller manages operations that the controller performs on the Flash memory, in order to optimize at least one portion of the operations.

9. The memory device of claim 8, wherein the controller actively extracts the high level information and temporarily stores the high level information for further use.

10. The memory device of claim 9, wherein according to the temporarily stored high level information, the controller manages the operations that the controller performs on the Flash memory.

11. The memory device of claim 8, wherein the high level information comprises a master boot record (MBR), partition information, and/or file system information.

12. The memory device of claim 11, wherein in a situation where the high level information comprises the file system information, the file system information comprises file allocation table (FAT) file system information, new technology file system (NTFS) information, and/or second extended file system information.

13. The memory device of claim 8, wherein the file system comprises a plurality of partitions, and the high level information comprises partition information and file system information of the partitions; and the controller extracts the partition information and the file system information of the partitions from the contents stored in the Flash memory.

14. The memory device of claim 8, wherein when it is detected that the high level information is changed or is going to be changed, the controller extracts at least one portion of a latest version of the high level information, and manages the operations of the Flash memory accordingly, in order to optimize at least one portion of the operations.

15. A controller of a memory device, the controller being utilized for accessing a Flash memory of the memory device, the Flash memory comprising a plurality of blocks, the controller comprising:
   a read only memory (ROM) arranged to store a program code; and
   a microprocessor arranged to execute the program code to control the access to the Flash memory and manage the plurality of blocks, wherein the controller that executes the program code by utilizing the microprocessor is further arranged to perform active Flash management;
   wherein the controller that executes the program code by utilizing the microprocessor extracts high level information of a file system of the Flash memory from contents stored in the Flash memory; and according to the high level information, the controller that executes the program code by utilizing the microprocessor manages operations that the controller performs on the Flash memory, in order to optimize at least one portion of the operations.

16. The controller of claim 15, wherein the controller that executes the program code by utilizing the microprocessor actively extracts the high level information and temporarily stores the high level information for further use.

17. The controller of claim 16, wherein according to the temporarily stored high level information, the controller that executes the program code by utilizing the microprocessor manages the operations that the controller performs on the Flash memory.

18. The controller of claim 15, wherein the high level information comprises a master boot record (MBR), partition information, and/or file system information.

19. The controller of claim 18, wherein in a situation where the high level information comprises the file system information, the file system information comprises file allocation table (FAT) file system information, new technology file system (NTFS) information, and/or second extended file system information.

20. The controller of claim 15, wherein the file system comprises a plurality of partitions, and the high level information comprises partition information and file system information of the partitions; and the controller that executes the program code by utilizing the microprocessor extracts the partition information and the file system information of the partitions from the contents stored in the Flash memory.

21. The controller of claim 15, wherein when it is detected that the high level information is changed or is going to be changed, the controller that executes the program code by utilizing the microprocessor extracts at least one portion of a latest version of the high level information, and manages the operations of the Flash memory accordingly, in order to optimize at least one portion of the operations.

\* \* \* \* \*